United States Patent Office.

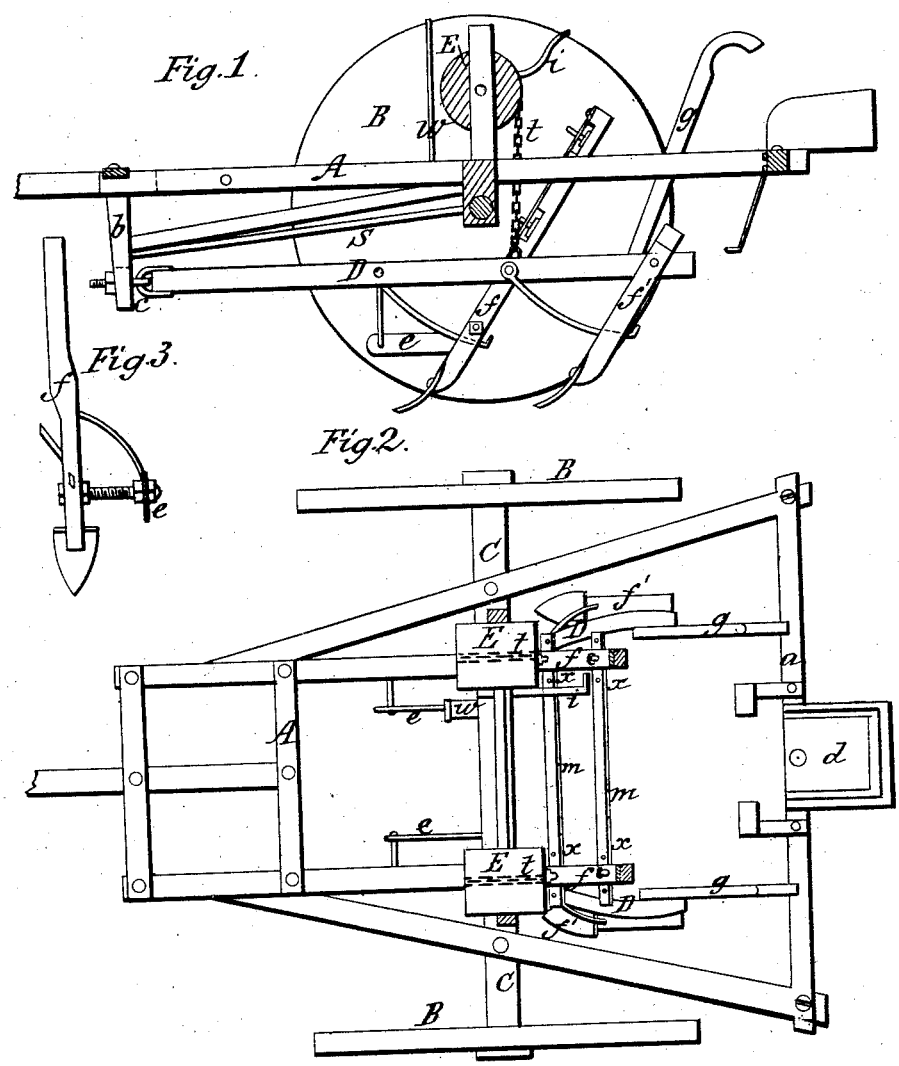

HIRAM BOYS, OF RUSHVILLE, INDIANA.

Letters Patent No. 65,158, dated May 28, 1867.

---

CULTIVATOR.

---

The Schedule referred to in these Letters Patent and making part of the same.

---

TO ALL WHOM IT MAY CONCERN:

Be it known that I, HIRAM BOYS, of Rushville, in the county of Rush, and in the State of Indiana, have invented certain new and useful improvements in Cultivators; and do hereby declare that the following is a full, clear, and exact description thereof, reference being had to the accompanying drawings, and the letters of reference marked thereon, making a part of this specification.

Figure 1 represents a longitudinal section.

Figure 2, a plan view; and

Figure 3, a view of one of the shovels and shield attached.

In the annexed drawings A represents a suitably-constructed frame supported upon an axle, C, with wheels B B. The rear cross-piece $a$ of this frame having a seat, $d$, for the driver, is made adjustable, so that the cultivator may be used for carrying the driver in the usual manner, or the driver may walk, as though operating the common plough. Upon the axle there are erected two small standards, which support a horizontal shaft provided with a roller, E, near each standard. One of these rollers is provided with a lever, $i$, while in front of this roller is placed a ratchet, $w$, for catching the lever and holding the roller as desired. At the forward extremity of the frame, each side of the tongue, are two pendent arms $b$, having three or more openings for connecting the swivels $c$ at the forward end of the shovel-beams D D. The shovel-beams D D extend from the arms $b$ under the frame to the rear of the axle C, and have, each, two uprights $f f'$, provided with shovels at their ends. At the side of each shovel-bar $f$ there are secured small metal shields $e$ $e$, to prevent the clods from rolling upon and injuring the growing plants. The shovel-beams D D are connected by means of two metallic plates $m$ $m$, which are provided with holes $x$ $x$ at each end, and through which pins are passed into the bars $f$ for connecting thereto. The distance between the shovels is regulated by these bars, while the depth of insertion is regulated by the holes in the pendent arms $b$. $g$ $g$ represent suitable handles attached to the end of each beam for operating and regulating the shovels. $t$ $t$ represent chains or cords, which are attached to the rollers and to the bars $f f$, so that the shovels may be elevated above the ground when not required in use. By this arrangement the shovels will cultivate the ground when in an uneven state as well as though upon smooth surface.

Having thus fully described my invention, what I claim as new, and desire to secure by Letters Patent, is—

1. The frame A, as constructed, with adjustable tail-piece $a$, arms $b$, with swivels for connecting the shovels, beams, and rollers E with chains for attaching the shovel-bars, when combined, arranged, and operating in the manner and for the purposes herein specified.

2. The beams D D, shovel-bars $f f'$, and shields $e$ $e$, connected by the adjustable bars $m$ $m$, in the manner and for the purposes set forth.

In testimony that I claim the foregoing I have hereunto set my hand this 6th day of April, 1867.

HIRAM BOYS.

Witnesses:
BENJAMIN L. SMITH,
JAMES BUSSEL.